(12) United States Patent
Matsuki et al.

(10) Patent No.: US 10,913,815 B2
(45) Date of Patent: Feb. 9, 2021

(54) CURABLE RESIN COMPOSITION

(71) Applicant: The Yokohama Rubber Co., LTD., Tokyo (JP)

(72) Inventors: Yuichi Matsuki, Hiratsuka (JP); Megumi Abe, Hiratsuka (JP)

(73) Assignee: The Yokohama Rubber Co., LTD.

( * ) Notice: Subject to any disclaimer, the term of this patent is extended or adjusted under 35 U.S.C. 154(b) by 182 days.

(21) Appl. No.: 15/526,715

(22) PCT Filed: Nov. 5, 2015

(86) PCT No.: PCT/JP2015/081159
§ 371 (c)(1),
(2) Date: May 12, 2017

(87) PCT Pub. No.: WO2016/076193
PCT Pub. Date: May 19, 2016

(65) Prior Publication Data
US 2017/0320996 A1    Nov. 9, 2017

(30) Foreign Application Priority Data

Nov. 13, 2014    (JP) ................................. 2014-230591

(51) Int. Cl.
| | | |
|---|---|---|
| *C08G 18/10* | (2006.01) | |
| *C08G 18/48* | (2006.01) | |
| *C09J 175/04* | (2006.01) | |
| *C08G 18/78* | (2006.01) | |
| *C08G 18/80* | (2006.01) | |
| *C08G 18/32* | (2006.01) | |
| *C08G 18/79* | (2006.01) | |
| *C08G 18/76* | (2006.01) | |
| *C08G 18/12* | (2006.01) | |
| *C08F 8/32* | (2006.01) | |
| *C08F 299/06* | (2006.01) | |
| *C08G 18/83* | (2006.01) | |
| *C08L 75/12* | (2006.01) | |

(52) U.S. Cl.
CPC ................ *C08G 18/10* (2013.01); *C08F 8/32* (2013.01); *C08F 299/065* (2013.01); *C08G 18/12* (2013.01); *C08G 18/3228* (2013.01); *C08G 18/4812* (2013.01); *C08G 18/7671* (2013.01); *C08G 18/7837* (2013.01); *C08G 18/792* (2013.01); *C08G 18/809* (2013.01); *C08G 18/837* (2013.01); *C08L 75/12* (2013.01); *C09J 175/04* (2013.01); *C08G 2190/00* (2013.01)

(58) Field of Classification Search
CPC .. C08G 18/10; C08G 18/792; C08G 18/4812; C08G 18/3228; C08G 18/12; C08G 18/809; C08G 18/7671; C08G 18/7837; C08G 18/837; C08G 2190/00; C09J 175/04; C08F 8/32; C08F 299/065; C08L 75/12
See application file for complete search history.

(56) References Cited

U.S. PATENT DOCUMENTS

| | | | |
|---|---|---|---|
| 5,866,668 A | 2/1999 | Maeda et al. | |
| 2002/0037964 A1* | 3/2002 | Miyata | C08G 18/771 525/100 |
| 2004/0265494 A1* | 12/2004 | Lu | C09D 5/03 427/372.2 |
| 2006/0106157 A1* | 5/2006 | Sawant | C08G 18/6229 524/589 |
| 2008/0269452 A1* | 10/2008 | Schwoeppe | C08G 18/10 528/28 |
| 2010/0273008 A1* | 10/2010 | Burckhardt | C08G 18/10 428/423.1 |
| 2011/0155320 A1* | 6/2011 | Kramer | C08K 3/36 156/330 |
| 2015/0315435 A1 | 11/2015 | Mori et al. | |

FOREIGN PATENT DOCUMENTS

| | | |
|---|---|---|
| JP | H10-158353 | 6/1998 |
| JP | H10-219098 | 8/1998 |
| JP | 2009-167272 | 7/2009 |
| JP | 2010-132753 | 6/2010 |
| JP | 2014-122256 | 7/2014 |
| JP | 2016-014079 | 1/2016 |
| WO | WO 1995/26374 | 10/1995 |
| WO | WO 2014/097905 | 6/2014 |

OTHER PUBLICATIONS

International Search Report for International Application No. PCT/JP2015/081159 dated Feb. 9, 2016, 4 pages, Japan.
Cai Haiyuan et al., Analysis and Improvement of Properties of Light/Wet Dual Curable Polyurethane Hot Melt Adhesive, Jan. 2013, vol. 22 No. 1, 8 pages, China.

* cited by examiner

*Primary Examiner* — Rabon A Sergent
(74) *Attorney, Agent, or Firm* — Thorpe North & Western

(57) ABSTRACT

The present technology provides a curable resin composition that contains a urethane prepolymer having an isocyanate group, a coated amine formed by using a filler to coat solid amine having a melting point of 50° C. or higher, an isocyanate group-containing compound having an isocyanate group bonded to an aliphatic hydrocarbon group and having a hydrolyzable silyl group or (meth)acryloyl group, and a tertiary amine compound.

7 Claims, 1 Drawing Sheet

FIG. 1A
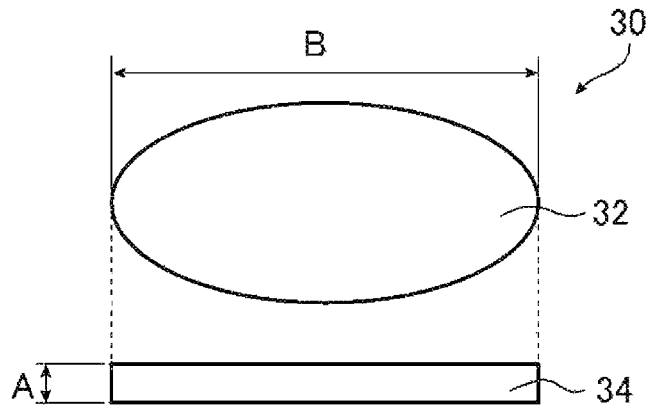
FIG. 1B
FIG. 2A
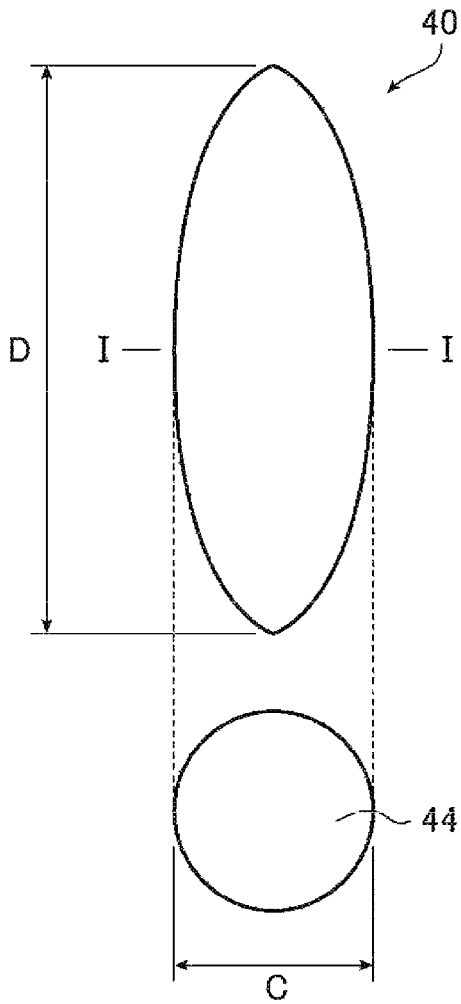
FIG. 2B

CURABLE RESIN COMPOSITION

TECHNICAL FIELD

The present technology relates to a curable resin composition.

BACKGROUND ART

In recent years, resin materials (e.g. olefin-based resins, and matrix resins of fiber reinforced plastic (FRP)) have been used for automobile bodies in place of steel plates from the perspective of reducing weight. Therefore, adhesive agents having excellent adhesion to resin materials and/or glass are further required in production of automobiles.

Meanwhile, compositions containing a urethane prepolymer have been used as adhesive agents, sealing materials, coating materials, and the like.

Such compositions are typically used in the form of one-component composition or a two-component composition further containing a polyamine compound. However, with a one-component composition, curing is slow since the one-component composition is typically moisture curable. Furthermore, although a two-component composition has excellent storage stability, handleability thereof is poor.

In such circumstances, to achieve both low temperature curability and storage stability, a heat curable composition which contains: (A) a polyisocyanate compound, an active terminal isocyanate group-containing urethane prepolymer obtained by reacting a polyol component with an excess amount of a polyisocyanate compound, or a mixture of these; and (B) a fine powder coating amine in which an active amino group on the surface is covered by fixing fine powder having a mean particle size of 2 μm or less onto the surface of a solid amine having a melting point of 50° C. or higher and a mean particle size of 20 μm or less in a manner that the weight ratio of the solid amine to the fine powder is from 1/0.001 to 0.5 has been proposed (see International Patent Application Publication No. WO 95/26374).

When a composition containing a urethane prepolymer and a coating amine was studied, the inventors of the present technology found that storage stability of such a composition does not achieve the level of storage stability required recently.

Furthermore, when such a composition was used to adhere at least one type selected from the group consisting of resin materials and glass in a moist environment or in a low temperature heating condition, the inventors of the present technology found that it was difficult to cure the composition by the moisture and/or the low temperature heating.

Furthermore, the inventors of the present technology found that, even when the composition is cured, the resulting shear strength is poor.

SUMMARY

The present technology provides a curable composition that has excellent storage stability, that is easily cured by moisture and/or low-temperature heating, and that has high shear strength after being cured.

The present technology provides a composition containing:

a urethane prepolymer having an isocyanate group;
a coated amine in which a solid amine having a melting point of 50° C. or higher is coated with a filler;
an isocyanate group-containing compound having an isocyanate group bonded to an aliphatic hydrocarbon group and at least one type selected from the group consisting of hydrolyzable silyl groups and (meth)acryloyl groups; and
a tertiary amine compound, predetermined effects can be achieved and thus completed the present technology.

The present technology provides the following features.

1. A curable resin composition containing:
   a urethane prepolymer having an isocyanate group;
   a coated amine in which a solid amine having a melting point of 50° C. or higher is coated with a filler;
   an isocyanate group-containing compound having an isocyanate group bonded to an aliphatic hydrocarbon group and at least one type selected from the group consisting of hydrolyzable silyl groups and (meth)acryloyl groups; and
   a tertiary amine compound.

2. The curable resin composition according to 1 above, where the isocyanate group-containing compound contains a compound obtained by reacting an aliphatic polyisocyanate compound with at least one type selected from the group consisting of secondary aminosilanes, mercaptosilanes, hydroxy group-containing (meth)acrylamides, and hydroxy group-containing (meth)acrylates.

3. The curable resin composition according to 1 or 2 above, where
   the isocyanate group-containing compound contains
   an isocyanate group/hydrolyzable silyl group-containing compound obtained by reacting an aliphatic polyisocyanate compound with secondary aminosilane and/or mercaptosilane; and/or
   an isocyanate group/(meth)acryloyl group-containing compound obtained by reacting an aliphatic polyisocyanate compound with a hydroxy group-containing (meth)acrylamide and/or a hydroxy group-containing (meth)acrylate.

4. The curable resin composition according to any one of 1 to 3 above, where a ratio value of a major axis of the filler to a particle thickness of the filler (major axis/particle thickness) is from 3 to 100, and the particle thickness is from 0.01 μm to 1 μm.

5. The curable resin composition according to any one of 1 to 4 above, further containing a filler.

The curable resin composition of the present technology has excellent storage stability, is easily cured by moisture and/or low-temperature heating, and has high shear strength after being cured.

BRIEF DESCRIPTION OF DRAWINGS

FIGS. 1A and 1B are a plan view (FIG. 1A) and a front view (FIG. 1B) schematically illustrating an embodiment of a plate-like filler.

FIGS. 2A and 2B are a plan view (FIG. 2A) and an I-I cross-sectional view (FIG. 2B) schematically illustrating an embodiment of a spindle-like filler.

DETAILED DESCRIPTION

The present technology is described in detail below.

Note that, in the present specification, "(meth)acryloyl" indicates acryloyl or methacryloyl, "(meth)acrylate" indicates acrylate or methacrylate, and "(meth)acryl" indicates acryl or methacryl.

In this specification, a numerical range expressed using "(from) . . . to . . . " refers to a range including a numerical value preceding "to" as a lower limit value and a numerical value following "to" as an upper limit value.

Furthermore, in this specification, when a component contains two or more types of substances, the "content of the component" refers to a total content of the two or more types of the substances.

Curable Resin Composition

The curable resin composition of the present technology (the composition of the present technology) is a curable resin composition containing:

a urethane prepolymer having an isocyanate group;

a coated amine in which a solid amine having a melting point of 50° C. or higher is coated with a filler;

an isocyanate group-containing compound having an isocyanate group bonded to an aliphatic hydrocarbon group and at least one type selected from the group consisting of hydrolyzable silyl groups and (meth)acryloyl groups; and a tertiary amine compound.

The curable resin composition of the present technology has excellent storage stability, is easily cured by moisture and/or low-temperature heating, and has high shear strength after being cured.

The reasons are not clear; however, the inventors of the present technology presume that the reasons are as follows.

In the present technology, since the solid amine is coated with a filler, the solid amine is less likely to react with a urethane prepolymer, thereby making the storage stability of the composition of the present technology excellent.

However, when water is in the system (e.g. water is adsorbed to a filler forming a coated amine, and water may be incorporated into the system by allowing such a coated amine to be contained), the water may reduce the stability of the coated amine, and the storage stability of the composition may be deteriorated.

Regarding such a problem, it is conceived that, by allowing a specific isocyanate group-containing compound to react with the water, it is possible to inhibit the reaction between the coated amine and the water and enhance stability of the coated amine, thereby enhancing the storage stability of the composition as a whole.

Furthermore, it is conceived that, when coating by the filler of the coated amine is not sufficient (e.g. cases where a part of the surface of the coated amine is not coated with the filler and the solid amine is exposed, or the like), a specific isocyanate group-containing compound functions effectively to stabilize the coated amine with insufficient coating. That is, a specific isocyanate-containing compound reacts with an amino group or the like located at the uncoated portion on the surface of the solid amine particle, and thus the amino group can be inactivated. By this, it is presumed that the composition of the present technology enhances the storage stability compared to the case where the specific isocyanate group-containing compound is not contained.

Furthermore, the composition of the present technology exhibits excellent adhesion to an adherend (e.g. glass or plastic) by allowing an isocyanate group-containing compound having a specific group to be contained. By this, it is presumed that the shear strength after curing is enhanced compared to the case of the composition that contains no specific isocyanate group-containing compound.

As described above, in the present technology, the inventors of the present technology presume that the specific isocyanate group-containing compound has the following effects and functions.

1. It is conceived that the specific isocyanate group-containing compound can react with water in the system of the composition and/or can supplement the coating of the coated amine. This allows the storage stability of the composition to be excellent.

2. By allowing the specific isocyanate group-containing compound to have a predetermined group, adhesion to a base material (adherend) can be enhanced.

Urethane Prepolymer

The composition of the present technology contains a urethane prepolymer containing an isocyanate group.

An example of a preferable aspect of the urethane prepolymer of the composition of the present technology is one in which an isocyanate group is contained at a terminal. The number of isocyanate groups contained in the urethane prepolymer is preferably a plural number (e.g. two).

The urethane prepolymer can be obtained by, for example, reacting a polyisocyanate compound with a polyol compound.

The polyisocyanate compound used during the production of the urethane prepolymer is not particularly limited. Examples thereof include aliphatic polyisocyanates (including alicyclic polyisocyanates) and aromatic polyisocyanates.

Among these, from the perspective of achieving even better storage stability and excellent thermosetting properties, an aromatic polyisocyanate is preferred, and diphenylmethane diisocyanate (hereinafter, also referred to as "MDI") is more preferred.

The polyol compound used during the production of the urethane prepolymer is not particularly limited as long as the polyol compound has two or more hydroxy groups. Examples thereof include polyether polyol, polyester polyol, polymer polyol, polycarbonate polyol, polybutadiene polyol, hydrogenated polybutadiene polyol, acryl polyol, and mixtures of these.

Examples of the polyether polyol include polyoxyethylene diol, polyoxyethylene triol, polyoxypropylene diol, polyoxypropylene triol, and diols or triols of copolymers of oxyethylene and oxypropylene.

Examples of the polyester polyol include condensation polymers of at least one type of low molecular weight polyol selected from the group consisting of ethylene glycol, propylene glycol, butane diol pentane diol, hexane diol, glycerin, and 1,1,1-trimethylolpropane, and at least one type selected from the group consisting of glutaric acid, adipic acid, pimelic acid, suberic acid, sebacic acid, dimer acid, low molecular weight aliphatic carboxylic acid, and oligomeric acid; and ring-opened polymers, such as propiolactone and valerolactone.

An example of a preferable aspect is one in which the polyol compound is polyoxypropylene diol (PPG) or polyoxypropylene triol.

The amounts of the polyisocyanate compound and the polyol compound used in the production of the urethane prepolymer are amounts that the ratio of NCO group/OH group (molar ratio) is preferably from 1.2 to 2.5, and more preferably from 1.5 to 2.2.

The production method of the urethane prepolymer is not particularly limited. For example, the urethane prepolymer can be produced by heating and agitating a polyisocyanate compound and a polyol compound at 50 to 100° C. As necessary, for example, a urethanation catalyst, such as an organotin compound, organobismuth, and amine, can be used.

The urethane prepolymer may be used alone, or a combination of two or more types of the urethane prepolymers may be used.

Coated Amine

The composition of the present technology contains a coated amine in which a solid amine having a melting point of 50° C. or higher is coated with a filler.

In the coated amine, all or at least a part of the surface of the solid amine is coated with the filler.

The solid amine in the coated amine is melted by being heated and can be reacted with the urethane prepolymer.

The ratio value of the major axis of the filler to the particle thickness of the filler (major axis/particle thickness) contained in the coated amine is preferably from 3 to 100.

Furthermore, the particle thickness of the filler contained in the coated amine is preferably from 0.01 µm to 1 µm.

Solid Amine

The solid amine will be described below. The solid amine used in the production of the coated amine contained in the composition of the present technology has a melting point of 50° C. or higher.

Note that the melting point is a value measured by a differential scanning calorimetry (DSC) at a rate of temperature increase of 10° C./min.

The melting point of the solid amine is preferably from 50 to 100° C. from the perspective of achieving even better storage stability and excellent thermosetting properties.

An example of a preferable aspect is one in which the solid amine is a polyamine having two or more amino groups or imino groups (—NH—) in each molecule.

Examples of the solid amine include aromatic polyamines, such as o-phenylenediamine, m-phenylenediamine, 2,3-tolylenediamine, 2,4-tolylenediamine, 2,5-tolylenediamine, 2,6-tolylenediamine, and 3,4-tolylenediamine; and aliphatic polyamines, such as 1,12-dodecanediamine, 1,10-decanediamine, 1,8-octanediamine, 1,14-tetradecanediamine, and 1,16-hexadecanediamine.

Among these, from the perspective of achieving even better storage stability and excellent thermosetting properties, an aliphatic polyamine is preferred, an aliphatic diamine is more preferred, and 1,12-dodecanediamine is even more preferred.

An example of a preferable aspect is one in which the solid amine is a crushed solid amine from the perspective of achieving even better storage stability, excellent uniformity of the composition, and excellent thermosetting properties.

From the perspective of achieving even better storage stability, excellent uniformity of the composition, and excellent thermosetting properties, the average particle size of the solid amine is preferably 75 µm or less, and more preferably from 2 to 20 µm.

In the present technology, the average particle size refers to a volume average particle size measured by dispersing the particles in methanol and performing measurement by a particle size distribution analyzer using laser diffraction (Microtrac MT3000 II (Laser Diffraction/Scattering Particle Size Distribution Analyzer, manufactured by Nikkiso Co., Ltd.))

From the perspective of achieving even better storage stability, excellent uniformity of the composition, and excellent thermosetting properties, the maximum particle size of the solid amine is preferably 300 µm or less, and more preferably less than 300 µm.

The maximum particle size refers to the maximum value of the volume particle size obtained by measuring the average particle size.

Filler

The filler will be described below.

In the present technology, the filler used in the production of the coated amine is not particularly limited.

Examples of the filler include talc, mica, calcium carbonate, and titanium oxide. Among these, from the perspective of easily performing surface treatment (e.g. hydrobizing treatment) and easily coating the solid amine particle (fillers are easily adsorbed on the solid amine particle surface), talc and calcium carbonate are preferred.

From the perspective of achieving even better storage stability, excellent thermosetting properties, and excellent appearance of the resulting thermosetting composition (e.g. aggregates and particles of the coated amine are less likely to occur in the composition; hereinafter the same), the ratio value of the major axis of the filler to the particle thickness of the filler (major axis/particle thickness) is preferably from 3 to 100, more preferably from 4 to 95, and even more preferably from 4 to 75.

From the perspective of achieving even better storage stability, even better curability, and excellent appearance of the resulting thermosetting composition, the particle thickness of the filler is preferably from 0.01 µm to 1 µm, more preferably from 0.01 to 0.9 µm, and even more preferably from 0.02 to 0.8 µm.

From the perspectives of achieving even better storage stability and thermosetting properties, the major axis of the filler is preferably from 0.1 to 15 µm, and more preferably from 0.3 to 5 µm.

In the present technology, the major axis of the filler is the average value obtained from major axes of discretionary selected 20 fillers measured by magnifying these using an electron microscope. The particle thickness of the filler is obtained similarly.

Furthermore, the major axis of the filler is the longest side length among all squares which circumscribe the filler and in which all the angles are right angles.

The form of the filler that may be used in the production of the coated amine is not particularly limited. Examples thereof include particle-like (including spherical), plate-like, and non-plate-like (excluding particle-like; hereinafter the same) forms.

Among these, the form of the filler is preferably plate-like or non-plate-like from the perspective of achieving even better storage stability and shear strength.

When the form of the filler is plate-like or non-plate-like for example, the major axis/particle thickness of the filler is preferably from 3 to 100, and more preferably from 4 to 100.

Particle-Like Filler

Examples of the particle-like filler include spherical or substantially spherical fillers.

The particle-like filler may be irregular.

In the present technology, the major axis/particle thickness of the particle-like filler may be less than 4.

Plate-Like Filler

The plate-like filler is preferably a filler having a plate-like form.

Examples of the form of the plate-like filler include disk-like, rectangular plate-like, strip-like, and other irregular plate-like forms. The periphery of the plate-like filler may be irregular.

The plate-like filler will be described below using the attached drawings. However, the present technology is not limited to the attached drawings.

FIGS. 1A and 1B are a plan view (FIG. 1A) and a front view (FIG. 1B) schematically illustrating an embodiment of a plate-like filler.

In FIGS. 1A and 1B, the plate-like filler 30 has a surface 32 of the plate-like filler illustrated in the plan view (FIG. 1A) and a side face 34 illustrated in the front view (FIG. 1B).

The largest diameter in the surface 32 is the major axis B of the plate-like filler 30. Furthermore, the thickness of the side face 34 is the particle thickness A of the plate-like filler 30.

Non-Plate-Like Filler

The non-plate-like filler will be described below.

Examples of the form of the non-plate-like filler include rod-like forms. Examples of the form of the rod-like filler include spindle-like, cylindrical, rectangular column-like, and needle-like forms.

The end portion of the rod-like filler may be sharp or round.

As the form of the non-plate-like filler, particle-like (e.g. spherical) forms are excluded.

When the non-plate-like filler is a rod-like filler, the particle thickness of the rod-like filler may be the same or varied from an end portion to the other end portion of the rod-like filler.

When the rod-like filler is a spindle-like filler, the particle thickness of the spindle-like filler refers to the maximum diameter of a cross section perpendicular to the major axis of the spindle-like filler.

The spindle-like filler will be described below using the attached drawings. However, the present technology is not limited to the attached drawings.

FIGS. 2A and 2B are a plan view (FIG. 2A) and an I-I cross-sectional view (FIG. 2B) schematically illustrating an embodiment of a spindle-like filler.

In the plan view of FIG. 2A, the spindle-like filler 40 has the major axis D. The position of the I-I cross section is substantially at the center of the major axis D.

The I-I cross-sectional view of FIG. 2B illustrates the cross section 44 of the I-I cross section of the plan view in FIG. 2A. In FIG. 2B, the cross section 44 has a particle thickness C.

From the perspective of achieving even better storage stability and excellent thermosetting properties, the amount of the filler used in the production of the coated amine is preferably from 50 to 300 parts by mass, and more preferably from 100 to 250 parts by mass, per 100 parts by mass of the solid amine.

The method of producing the coated amine is not particularly limited. Examples thereof include a production method using a shear-friction mixing method in which the filler is added to the solid amine, and the solid amine and the filler are mixed while being crushed to fix the filler on the surface of the solid amine.

Furthermore, another example is a method of producing the coated amine by mixing a solid amine, which has been finely crushed in advance, with a filler using a high-speed impact type mixer, compression shear type mixer, or spray drying device. Examples of the high-speed impact type mixer include Henschel mixer, jet mill, and pearl mill.

In the present technology, an example of a preferable aspect is one in which all or at least a part of the coated amine surface has been subjected to surface treatment (e.g. hydrophobizing treatment) by at least one type selected from the group consisting of silane coupling agents and silicone oils. Examples of the aspect in which all or at least a part of the coated amine surface has been subjected to surface treatment include an aspect in which all or at least a part of the surface of the solid amine and the filler contained in the coated amine has been subjected to hydrophobizing treatment.

Surface Treating Agent

When the filler adsorbs moisture, reaction between the urethane prepolymer and the solid amine may proceed. Therefore, when the filler has undergone hydrophobizing treatment using at least one type of surface treating agent selected from the group consisting of silane coupling agents and silicone oils, even better storage stability is achieved, which is preferred.

Furthermore, when the solid amine has undergone hydrophobizing treatment using at least one type of surface treating agent selected from the group consisting of silane coupling agents and silicone oils, even better storage stability is achieved because of the barrier effect that prevents contact and reaction between an active hydrogen on the solid amine particle surface and an isocyanate group in the matrix.

The silane coupling agent and the silicone oil as the surface treating agents used in the hydrophobizing treatment (surface treatment) are not particularly limited.

Among these, silicone oil is preferred from the perspectives of achieving even better storage stability and achieving high hardness of the cured product obtained by using the thermosetting composition.

Examples of the silicone oil include diorganopolysiloxanes, such as dimethyl silicone oil and methylphenyl silicone oil; organohydrogenpolysiloxanes, such as methylhydrogen silicone oil; and silicone oils in which various functional group(s) is introduced to at least one of side chains and terminals. Among these, an organohydrogenpolysiloxane is more preferred from the perspective of achieving even better storage stability of the adhesive composition containing the coated amine. Although the reason is not clear, it is presumed that the barrier effect described above can be maintained even after the coated amine has undergone a dynamic condition where the coated amine was kneaded with other powders except the coated amine (e.g. carbon) and/or a urethane prepolymer to be composited, the organohydrogenpolysiloxane exhibits strong electrostatic interaction with the surface of the filler for coating the solid amine (irregular filler) and the surface of the solid amine.

From the perspective of achieving even better storage stability and excellent thermosetting properties and excellent adhesion, the amount of the surface treating agent is preferably from 0.1 to 5 parts by mass, and more preferably from 0.5 to 2 parts by mass, per 100 parts by mass total of the filler and the solid amine.

The method of hydrophobizing treatment is not particularly limited. For example, the hydrophobizing treatment may be performed by adding the surface treating agent when the solid amine particles and the filler are mixed. Furthermore, the hydrophobizing treatment may be performed in advance onto at least one type selected from the group consisting of the filler and the solid amine. The hydrophobizing treatment may be performed onto the coated amine.

From the perspective of achieving even better storage stability, excellent uniformity of the composition, and excellent thermosetting properties, the average particle size of the coated amine is preferably 100 µm or less, and more preferably from 2 to 75 µm.

The coated amine may be used alone, or a combination of two or more types of the coated amines may be used.

From the perspective of achieving even better storage stability and excellent physical properties of cured products, the content of the coated amine (including the amount of the surface treating agent if the coated amine has undergone surface treatment) is preferably from 0.1 to 50 parts by mass, and more preferably from 0.3 to 30 parts by mass, per 100 parts by mass of the urethane prepolymer.

Isocyanate Group-Containing Compound

The composition of the present technology contains an isocyanate group-containing compound having an isocyanate group bonded to an aliphatic hydrocarbon group and at least one type selected from the group consisting of hydrolyzable silyl groups and (meth)acryloyl groups.

The isocyanate group-containing compound can be cured by being reacted with the urethane prepolymer and with at least one of moisture and heating.

Isocyanate Group

The number of the isocyanate group contained in one molecule of the isocyanate group-containing compound may be from 1 to 15, and preferably from 1 to 4.

Aliphatic Hydrocarbon Group

The aliphatic hydrocarbon group to which the isocyanate group can bond is not particularly limited. The aliphatic hydrocarbon group may be straight, branched, or cyclic aliphatic hydrocarbon group or may be a combination of these. The aliphatic hydrocarbon group may have an unsaturated bond. The number of carbons contained in the aliphatic hydrocarbon group is preferably from 1 to 40.

The aliphatic hydrocarbon group may have a heteroatom, such as an oxygen atom, a nitrogen atom, or a sulfur atom.

One or more isocyanate groups may be bonded to one aliphatic hydrocarbon group.

Examples of the aliphatic hydrocarbon group include residues of straight or branched aliphatic hydrocarbon groups, such as a methyl group, an ethyl group, a propyl group, a butyl group, a pentyl group, a hexyl group, an octyl group, a decyl group, and an eicosyl group; and residues of alicyclic hydrocarbon groups, such as a cyclopentyl group, a cyclohexyl group, and an isophorone backbone.

Among these, a residue of a pentyl group, a hexyl group, or an isophorone backbone is preferably contained.

Furthermore, the aliphatic hydrocarbon group may contain a residue of a modified product of an aliphatic polyisocyanate compound, such as an adduct, an isocyanurate, a biuret, and an allophanate.

Examples of the aliphatic hydrocarbon group to which the isocyanate group bonds include groups represented by Formula (I) below.

$$—R^1—(NCO)_n \quad (I)$$

In Formula (I), $R^1$ is an aliphatic hydrocarbon group similar to those described above.

n is from 1 to 4.

In the isocyanate group-containing compound, an example of a preferable aspect is one in which the isocyanate group directly bonds to the aliphatic hydrocarbon group.

Hydrolyzable Silyl Group and (Meth)Acryloyl Group

The isocyanate group-containing compound contains at least one type selected from the group consisting of hydrolyzable silyl groups and (meth)acryloyl groups.

The number of the at least one type selected from the group consisting of hydrolyzable silyl groups and (meth)acryloyl groups contained in one molecule of the isocyanate group-containing compound is preferably from 1 to 4.

Hydrolyzable Silyl Group

Examples of the hydrolyzable silyl group include substances in which one to three hydrolyzable groups are bonded to one silicon atom.

Hydrolyzable Group

Examples of the hydrolyzable group include groups represented by Formula (II) below.

$$—OR^2 \quad (II)$$

In Formula (II), $R^2$ represents a hydrocarbon group. The hydrocarbon group is not particularly limited. Examples thereof include aliphatic hydrocarbon groups (including alicyclic; hereinafter the same) and aromatic hydrocarbon groups. Examples of the aliphatic hydrocarbon group include alkyl groups, such as a methyl group and an ethyl group.

Examples of the hydrolyzable silyl group include alkoxysilyl groups. Specific examples thereof include methoxysilyl groups (monomethoxysilyl group, dimethoxysilyl group, and trimethoxysilyl group) and ethoxysilyl groups (monoethoxysilyl group, diethoxysilyl group, and triethoxysilyl group).

In the present technology, as the hydrolyzable group, an OH group obtained after the hydrolyzable group is hydrolyzed can be contained.

In the hydrolyzable silyl group, when one or two hydrolyzable groups are bonded to one silicon atom, other groups that can bond to the same silicon atom are not particularly limited. Examples thereof include hydrocarbon groups.

Examples of the hydrocarbon group include aliphatic hydrocarbon groups (which may be straight, branched, alicyclic, or combinations of these; may have an unsaturated bond; hereinafter the same), aromatic hydrocarbon groups, and combinations of these. Among these, an example of a preferable aspect is an aliphatic hydrocarbon group.

Examples of the hydrolyzable silyl group include groups represented by Formula (III) below.

$$—Si(OR^{32})_m R^3_{3-m} \quad (III)$$

In Formula (III), $OR^{32}$ is the hydrolyzable group described above. $R^{32}$ is similar to $R^2$ in Formula (II) described above.

$R^3$ is a hydrocarbon group. The hydrocarbon group is similar to the hydrocarbon group that can bond to the silicon atom contained in the hydrolyzable silyl group.

m is from 1 to 3.

(Meth)Acryloyl Group (Meth)Acryloyl Group

The (meth)acryloyl group is not particularly limited as long as the (meth)acryloyl group is a (meth)acryloyl group or a group having a (meth)acryloyl group.

The (meth)acryloyl group is a group represented by Formula (IV) below.

$$CH_2=CR^4—CO— \quad (IV)$$

In Formula (IV), $R^4$ is a hydrogen atom or a methyl group.

Group Having (Meth)Acryloyl Group

Examples of the group having a (meth)acryloyl group include (meth)acryloyloxy groups represented by Formula (V) below and a (meth)acrylamide group.

(Meth)Acryloyloxy Group $$CH_2=CR^{54}—CO—O— \quad (V)$$

In Formula (V), $R^{54}$ is a hydrogen atom or a methyl group.

(Meth)Acrylamide Group

Examples of the (meth)acrylamide group include groups represented by Formula (VI) below.

$$CH_2=CR^{64}—CO—NH— \quad (VI)$$

In Formula (VI), $R^{64}$ is a hydrogen atom or a methyl group.

The aliphatic hydrocarbon group to which the isocyanate group is bonded and can be bonded to at least one type selected from the group consisting of hydrolyzable silyl groups and (meth)acryloyl groups directly or via an organic group.

Organic Group

The organic group is not particularly limited. Examples thereof include hydrocarbon groups that may have a heteroatom, such as an oxygen atom, a nitrogen atom, a sulfur atom, and a halogen. Examples of the hydrocarbon group include aliphatic hydrocarbon groups, aromatic hydrocarbon groups, and combinations of these.

The organic group may be a di- or higher valent organic group.

The hydrocarbon group may bond, via a substituent, to the aliphatic hydrocarbon group to which the isocyanate group is bonded or the hydrolyzable silyl group or the (meth)acryloyl group. Furthermore, the hydrocarbon groups may be bonded to each other via a substituent. Examples of the substituent include a urethane bond, a urea bond, a thiourethane bond (e.g. NH—CO—S—), and an ester bond; residues of modified products of polyisocyanate, such as an adduct, an isocyanurate, a biuret, and an allophanate; and combinations of these.

Examples of the urea bond include groups represented by Formula (VII) below.

—NH—CO—NX— (VII)

In Formula (VII), X may be a hydrogen atom or another organic group. Such another organic group is not particularly limited. Specific examples thereof include a phenyl group and —CO—O—CH$_2$CH$_2$—O—.

When the organic group is a combination of a hydrocarbon group and a substituent, examples of such an organic group include groups represented by Formula (VIII) below.

—(N*$^1$—CO—NH—C$_x$H$_{2x}$)—N*$^2$—CO—NH— (VIII)

In Formula (VIII), x may be 6, for example.
y can be from 1 to 3.
To each of N*$^1$ and N*$^2$, *$^3$—CO—O—CH$_2$CH$_2$—O—*$^4$ can be bonded.
*$^3$ represents a bonding position of N*$^1$ or N*$^2$.
To *$^4$, for example, a (meth)acryloyl group can be bonded.

Isocyanate Group/Hydrolyzable Silyl Group-Containing Compound and Isocyanate Group/(Meth)Acryloyl Group-Containing Compound Examples of the isocyanate group-containing compound include an isocyanate group/hydrolyzable silyl group-containing compound having a predetermined isocyanate group and a hydrolyzable silyl group, and an isocyanate group/(meth)acryloyl group-containing compound having a predetermined isocyanate group and a (meth)acryloyl group.

Isocyanate Group/Hydrolyzable Silyl Group-Containing Compound

Examples of the isocyanate group/hydrolyzable silyl group-containing compound include compounds represented by Formula (1) below.

$$[(OCN)_{n1}—R^{11}]_{a1}—R^{15}{}_{c1}—[—Si(OR^{12})_{m1}R^{13}{}_{3-m1}]_{b1} \quad (1)$$

In Formula (1), $R^{11}$ is similar to $R^1$ in Formula (I) above.
$R^{12}$ is similar to $R^2$ in Formula (II) described above.
$R^{13}$ is similar to $R^3$ in Formula (III) described above.
m1 is from 1 to 3.
n1 is from 1 to 4.
$R^{15}$ is an organic group. The organic group is similar to the organic group through which the aliphatic hydrocarbon group to which the isocyanate group is bonded and at least one type selected from the group consisting of hydrolyzable silyl groups and (meth)acryloyl groups are bonded.
a1 is from 1 to 3.
b1 is from 1 to 4, and preferably from 1 to 3.
c1 is 0 or 1.

Isocyanate Group/(Meth)Acryloyl Group-Containing Compound

Examples of the isocyanate group/(meth)acryloyl group-containing compound include compounds represented by Formula (2) below.

$$[(OCN)_{n2}—R^{21}]_{a2}—R^{25}{}_{c2}—[Y^2—CO—CR^{24}{=}CH_2]_{b2} \quad (2)$$

In Formula (2), $R^{21}$ is similar to $R^1$ in Formula (I) above.
$R^{24}$ is a hydrogen atom or a methyl group.
n2 is from 1 to 4.
$R^{25}$ is an organic group. The organic group is similar to the organic group through which the aliphatic hydrocarbon group to which the isocyanate group is bonded and at least one type selected from the group consisting of hydrolyzable silyl groups and (meth)acryloyl groups are bonded.
$Y^2$ is an oxygen atom or —NH—.
a2 is from 1 to 3.
b2 is from 1 to 4, and preferably from 1 to 3.
c2 is 0 or 1.

Specific examples of the isocyanate group/(meth)acryloyl group-containing compound include 2-isocyanatoethyl (meth)acrylate, 1,1-(bisacryloyloxymethyl)ethyl isocyanate represented by Formula (3) below, 1,1-(bismethacryloyloxymethyl)ethyl isocyanate, and compounds represented by Formula (4) below.

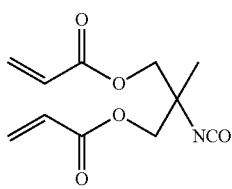

(3)

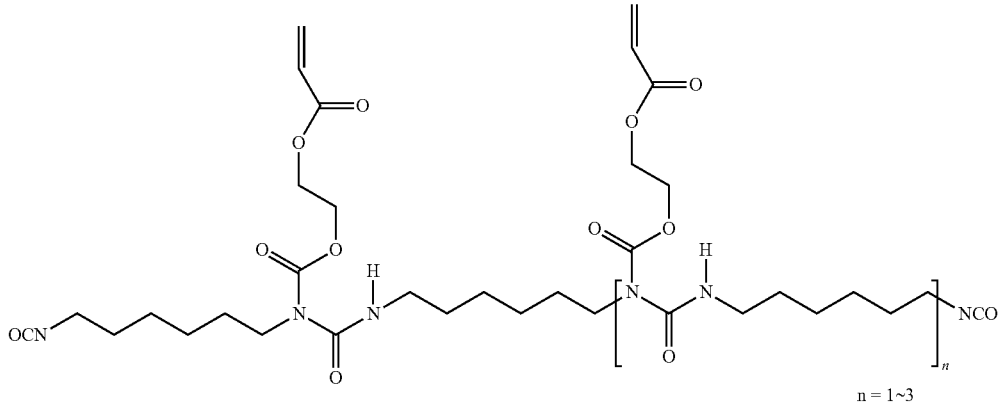

(4)

n = 1~3

The isocyanate group-containing compound preferably at least contains a compound obtained by reacting an aliphatic polyisocyanate compound with at least one type selected from the group consisting of secondary aminosilanes, mercaptosilanes, hydroxy group-containing (meth)acrylamides, and hydroxy group-containing (meth)acrylates (hereinafter, also referred to as "secondary aminosilane or the like").

Method of Obtaining Isocyanate Group-Containing Compound

The method of producing the isocyanate group-containing compound is not particularly limited. Furthermore, a commercially available product may be used as the isocyanate group-containing compound.

Examples of the method of producing the isocyanate group-containing compound include a method in which an aliphatic polyisocyanate compound and at least one type selected from the group consisting of secondary aminosilanes, mercaptosilanes, hydroxy group-containing (meth)acrylamides, and hydroxy group-containing (meth)acrylates (hereinafter, also referred to as "secondary aminosilane or the like") are heated and reacted while being agitated.

Examples of the method of producing the isocyanate group/hydrolyzable silyl group-containing compound include a method in which an aliphatic polyisocyanate compound and at least one type selected from the group consisting of secondary aminosilanes and mercaptosilanes are reacted.

Examples of the method of producing the isocyanate group/(meth)acryloyl group-containing compound include a method in which an aliphatic polyisocyanate compound and at least one type selected from the group consisting of hydroxy group-containing (meth)acrylamides and hydroxy group-containing (meth)acrylates are reacted.

Aliphatic Polyisocyanate Compound

The aliphatic polyisocyanate compound that can be used in the production of the isocyanate group-containing compound is a compound in which a plurality of isocyanate groups are bonded to an aliphatic hydrocarbon group. Specific examples thereof include diisocyanate compounds, such as hexamethylene diisocyanate (HDI), trimethylhexamethylene diisocyanate (TMHDI), and isophorone diisocyanate; and modified products, such as adducts, isocyanurates, biurets, and allophanates of these (e.g. an adduct of trimethylolpropane).

Among these, a modified product of hexamethylene diisocyanate is preferred.

Secondary Aminosilane

The secondary aminosilane that can be used in the production of the isocyanate group-containing compound (isocyanate group/hydrolyzable silyl group-containing compound) is a silane coupling agent having R—NH— (R is a monovalent organic group) and a hydrolyzable silyl group.

The monovalent organic group is not particularly limited. Examples thereof include hydrocarbon groups that may have a heteroatom, such as an oxygen atom, a nitrogen atom, a sulfur atom, and a halogen. Examples of the hydrocarbon group include aliphatic hydrocarbon groups, aromatic hydrocarbon groups, and combinations of these.

The hydrolyzable silyl group is similar to those described above.

R—NH— and the hydrolyzable silyl group can be bonded to each other via an organic group.

Examples of the secondary aminosilane include monosilyl compounds, such as N-phenyl-3-aminopropyltrimethoxysilane, N-phenyl-3-aminopropyltriethoxysilane, N-n-propyl-3-aminopropyltrimethoxysilane, and N-n-butyl-3-aminopropyltrimethoxysilane; and disilyl compounds, such as N,N-bis[(3-trimethoxysilyl)propyl]amine, N,N-bis[(3-triethoxysilyl)propyl]amine, and N,N-bis[(3-tripropoxysilyl)propyl]amine.

Mercaptosilane

The mercaptosilane that can be used in the production of the isocyanate group-containing compound (isocyanate group/hydrolyzable silyl group-containing compound) is a silane coupling agent having a mercapto group and a hydrolyzable silyl group. The hydrolyzable silyl group is similar to those described above. The mercapto group and the hydrolyzable silyl group can be bonded to each other via an organic group.

Examples of the mercaptosilane include 3-mercaptopropyltrimethoxysilane and 3-mercaptopropyltriethoxysilane.

Hydroxy Group-Containing (Meth)Acrylamide

The hydroxy group-containing (meth)acrylamide that can be used in the production of the isocyanate group-containing compound (isocyanate group/(meth)acryloyl group-containing compound) is a compound having a hydroxy group and a (meth)acrylamide group. The hydroxy group and the (meth)acrylamide group can be bonded to each other via an organic group.

Examples of the hydroxy group-containing (meth)acrylamide include N-hydroxyethyl(meth)acrylamide, N-hydroxypropyl(meth)acrylamide, and N-hydroxybutyl(meth)acrylamide.

Hydroxy Group-Containing (Meth)Acrylate

The hydroxy group-containing (meth)acrylate that can be used in the production of the isocyanate group-containing compound (isocyanate group/(meth)acryloyl group-containing compound) is a compound having a hydroxy group and a (meth)acryloyloxy group.

Examples of the hydroxy group-containing (meth)acrylate include hydroxyethyl(meth)acrylate, hydroxypropyl(meth)acrylate, and hydroxybutyl(meth)acrylate.

When the aliphatic polyisocyanate compound and the secondary aminosilane or the like are reacted, the used amounts of these are preferably amounts such that the molar ratio of the isocyanate group contained in the aliphatic polyisocyanate compound to the active hydrogen-containing group contained in the secondary aminosilane or the like (molar ratio of NCO/active hydrogen-containing group) is from 1.5 to 10.

The reaction of the aliphatic polyisocyanate compound and the secondary aminosilane or the like are not particularly limited. Examples thereof include conventionally known reactions.

When a reaction product of an aliphatic polyisocyanate compound and a secondary aminosilane or the like is used as the isocyanate group-containing compound, the isocyanate group-containing compound may further contain at least one type of unreacted substance selected from the group consisting of aliphatic polyisocyanate compounds and secondary aminosilanes or the like, in addition to the reaction product.

The isocyanate group-containing compound may be used alone, or a combination of two or more types of the isocyanate group-containing compounds may be used.

An example of a preferable aspect of the isocyanate group-containing compound is one in which an isocyanate group/hydrolyzable silyl group-containing compound and an isocyanate group/(meth)acryloyl group-containing compound are used in combination.

In this case, an example of a preferable aspect is one in which the isocyanate group/hydrolyzable silyl group-containing compound is a compound obtained by reacting an aliphatic polyisocyanate compound and at least one type selected from the group consisting of secondary aminosilanes and mercaptosilanes.

Furthermore, an example of a preferable aspect is one in which the isocyanate group/(meth)acryloyl group-containing compound is a compound obtained by reacting an aliphatic polyisocyanate compound and at least one type selected from the group consisting of hydroxy group-containing (meth)acrylamides and hydroxy group-containing (meth)acrylates.

When the isocyanate group/hydrolyzable silyl group-containing compound and the isocyanate group/(meth)acryloyl group-containing compound are used in combination, the mass ratio of the isocyanate group/(meth)acryloyl group-containing compound to the isocyanate group/hydrolyzable silyl group-containing compound [(isocyanate group/(meth)acryloyl group-containing compound)/(isocyanate group/hydrolyzable silyl group-containing compound)] is preferably from 0.1 to 10, and more preferably from 0.5 to 5.

The content of the isocyanate group-containing compound is preferably from 0.5 to 80 parts by mass, and more preferably from 1 to 50 parts by mass, per 100 parts by mass of the urethane prepolymer.

Tertiary Amine

The composition of the present technology contains a tertiary amine compound.

The tertiary amine can function as a catalyst to cure the isocyanate group by moisture.

Examples of the tertiary amine include trimethylamine, triethylamine, tripropylamine, tributylamine, triamylamine, trihexylamine, trioctylamine, trilaurylamine, dimethylethylamine, dimethylpropylamine, dimethylbutylamine, dimethylamylamine, dimethylhexylamine, dimethylcyclohexylamine, dimethyloctylamine, dimethyllaurylamine, triallylamine, tetramethylethylenediamine, triethylenediamine, N-methylmorpholine, 4,4'-(oxydi-2,1-ethanediyl)bis-morpholine, N,N-dimethylaminoethylmorpholine, N,N-dimethylbenzylamine, pyridine, picoline, dimethylaminomethylphenol, trisdimethylaminomethylphenol, 1,8-diazabicyclo[5.4.0]undecene-1, 1,4-diazabicyclo[2.2.2]octane, triethanolamine, N,N'-dimethylpiperazine, tetramethyl butanediamine, dimorpholinodiethyl ether, bis(2,2-morpholinoethyl)ether, and bis(dimethylaminoethyl)ether.

One type of these tertiary amines can be used alone, or two or more types can be used in combination.

Among these, morpholine-based compounds, such as N,N-dimethylamino ethylmorpholine and dimorpholinodiethylether, are preferred because excellent film formability during coating and excellent balance between storage stability and curing rate are achieved.

The content of the tertiary amine is preferably from 0.01 to 10 parts by mass, and more preferably from 0.1 to 5 parts by mass, per 100 parts by mass total of the urethane prepolymer and the isocyanate group-containing compound.

Filler

The composition of the present technology preferably further contains a filler from the perspective of achieving even better shear strength.

The filler is not particularly limited. Examples thereof include carbon black, calcium carbonate, and talc.

Among these, at least one type selected from the group consisting of carbon black and calcium carbonate is preferred.

The carbon black that can be used in the composition of the present technology is not particularly limited. Examples thereof include conventionally known carbon blacks. The carbon black may be used alone or a combination of two or more types of carbon blacks may be used.

The calcium carbonate that can be used in the composition of the present technology is not particularly limited. Examples thereof include heavy calcium carbonate, precipitated calcium carbonate (light calcium carbonate), and colloidal calcium carbonate. For example, the calcium carbonate may have undergone surface treatment by a fatty acid, or a fatty acid ester. The calcium carbonate may be used alone, or a combination of two or more types of the calcium carbonates may be used.

In the present technology, the content of the filler is preferably from 1 to 200 parts by mass, and more preferably from 5 to 150 parts by mass, per 100 parts by mass of the urethane prepolymer.

When the carbon black and the calcium carbonate are used in combination, the mass ratio of the calcium carbonate to the carbon black [calcium carbonate/carbon black] is preferably from 0.01 to 10, and more preferably from 0.1 to 5.

Additives

The composition of the present technology may further contain, if necessary, various additives, in a range that does not inhibit the object of the present technology, such as curing agents except the coated amine, curing catalysts except the tertiary amine, plasticizers, anti-aging agents, antioxidants, pigments (dyes), thixotropic agents, ultraviolet absorbers, flame retardants, surfactants (including leveling agents), dispersing agents, dehydrating agents, adhesion promoters, antistatic agents, and solvents. The content of the additive is not particularly limited. For example, the content of the additive may be the same as a conventionally known content.

The method of producing the composition of the present technology is not particularly limited. For example, the production can be performed by mixing the components described above. In this case, the coated amine, the isocyanate group-containing compound, the urethane prepolymer, and the tertiary amine may be mixed at the same time. Furthermore, the coated amine and the isocyanate group-containing compound may be mixed in advance, and then the urethane prepolymer and the tertiary amine may be mixed into the mixture.

Examples of the base material to which the composition of the present technology can be applied include plastics, glass, rubbers, and metals.

Examples of the plastic include polymers of propylene-, ethylene-, and/or cycloolefin-based monomers. The polymers described above may be homopolymers, copolymers, or hydrogenated products.

Specific examples of the plastic include olefin resins, such as polypropylene, polyethylene, COP, and COC, polyester resins, such as polyethylene terephthalate (PET) and polybutylene terephthalate (PBT), polymethyl methacrylate resins (PMMA resins), polycarbonate resins, polystyrene resins, acrylonitrile-styrene copolymer resins, polyvinyl chloride resins, acetate resins, acrylonitrile-butadiene-styrene resins (ABS resins), and hardly adhesive resins, such as polyamide resins.

Note that "COC" indicates cycloolefin copolymers, such as copolymers of tetracyclododecene and olefin such as ethylene.

Furthermore, "COP" indicates cycloolefin polymers, such as polymers obtained by, for example, subjecting norbornenes to ring-opening polymerization and hydrogenation.

The base material may have undergone surface treatment. Examples of the surface treatment include flame treatment, corona treatment, and ITRO treatment. These treatments are not particularly limited. Examples thereof include conventionally known treatments.

The method of applying the composition of the present technology to the base material is not particularly limited. Examples thereof include conventionally known methods.

The composition of the present technology can be cured by moisture and/or by heating. That is, the composition of the present technology needs to have thermosetting properties and/or moisture curability.

The composition of the present technology can be cured in a condition at a moisture environment of a relative humidity of 5 to 95 (% RH).

The composition of the present technology can be cured in a condition at a heating environment of, for example, 5 to 90° C.

In the present technology, the order of the curing by moisture and the curing by heating is not particularly limited. One of these may be performed first, or these may be performed simultaneously.

Examples of the use of the composition of the present technology include adhesive agents for glass holders of automobiles, direct glazing adhesives, sealants for automobiles, and sealants for building components.

Examples

The present technology is described below in detail using examples but the present technology is not limited to such examples.

Production of Composition

The components shown in Tables 1-1 and 1-2 below were used in compositions (part by mass) shown in the same tables and mixed by an agitator to produce compositions.

Production of Test Sample

One sheet of polybutylene terephthalate (PBT) plate of polybutylene terephthalate having a width of 25 mm, a length of 120 mm, and a thickness of 3 mm (PBT test piece, manufactured by Engineering Test Service K.K.) and one sheet of glass plate having the same size as the size of the PBT plate were prepared.

Thereafter, the composition produced as described above was coated on the surface of the PBT plate in a manner that the width was 25 mm, the length was 10 mm, and the thickness was 0.5 mm, and then a glass plate was adhered thereto to produce a laminate.

Curing of Laminate

The laminate produced as described above was cured by moisture and/or heating in the following curing conditions to produce an initial test sample.

Curing condition 1: The laminate produced as described above was heated in a condition at 80° C. for 10 minutes, and then allowed to be cooled in a condition at 20° C. and 50% RH for 5 minutes.

Curing condition 2: The laminate produced as described above was heated in a condition at 80° C. for 10 minutes, and then left in a condition at 20° C. and 50% RH for 1 day.

Curing condition 3: The laminate produced as described above was left in a condition at 25° C. and 50% RH for 7 days.

Storage Test

Storage test was performed by leaving the initial test sample produced as described above in a condition at 40° C. for 1 week.

Adhesion (Shear Strength)

The shear strength was measured using each of the initial test sample produced as described above and the test sample after storage test, by the following method.

The shear strength was measured by performing a tensile lap-shear strength test (tensile speed of 50 mm/min) in accordance with JIS K6850:1999 in a condition at 20° C. The results are shown in Table 1 below.

When the shear strength was 3 MPa or greater, the test sample was evaluated as having significantly excellent shear strength and recorded as "excellent".

When the shear strength was 1.5 MPa or greater but less than 3 MPa, the test sample was evaluated as having excellent shear strength and recorded as "good".

When the shear strength was 0.7 MPa or greater but less than 1.5 MPa, the test sample was evaluated as having low shear strength and recorded as "marginal".

When the shear strength was less than 0.7 MPa, the test sample was evaluated as having extremely low shear strength and recorded as "poor".

Adhesion (Failure State)

The failure state of the test sample, by which the shear strength was measured, was observed visually.

The test sample with cohesive failure of the adhesive agent was evaluated as "CF".

The test sample with interfacial failure between the adherend and the adhesive agent was evaluated as "AF". Note that, when the adhesive layer was interfacially separated in the glass side, the result was written as "AF (glass side)". When the adhesive layer was interfacially separated in the PBT side, the result was written as "AF (PBT side)".

The numerical values written after "CF" or "AF (glass side or PBT side)" represent approximate areas (%) occupied by the failure states on the adhering surface. The results are shown in Tables 1-1 and 1-2 below.

When the area occupied by CF was 40% or greater, the adhesion was evaluated as excellent. When the area occupied by CF was 80% or greater, the adhesion was evaluated as even more excellent.

Ejection Performance Using Glue Gun

The adhesive composition produced as described above was charged in a cartridge, and the opening of the cartridge was closed and tightly sealed. After the adhesive composition was stored at 40° C. for 1 week, the adhesive composition was allowed to be cooled at 20° C. for 1 hour. The opening of the cartridge was opened to attach a nozzle (tip diameter of 10 mm, length of 8 cm) and the cartridge was installed in a glue gun (trade name: Cartridge gun (YCG-2300HC), manufactured by Yamamoto Seisaku Co., Ltd.) to evaluate ejection performance of the composition.

When the composition was easily extruded by an ordinary stroke and the ejected amount of the composition was 6 g or greater per 2 seconds, the ejection performance was evaluated as excellent and recorded as "good".

When the extrusion was somewhat difficult and the ejected amount of the composition was 1.5 g or greater but less than 6 g within the time interval described above, the ejection performance was evaluated as somewhat poor and recorded as "marginal".

When the content (composition) was gelled or thickened and was almost impossible to be extruded and the ejected amount of the composition was less than 1.5 g within the time interval described above, the ejection performance was evaluated as poor and recorded as "poor".

TABLE 1-1

| | | | | Examples | | | | |
|---|---|---|---|---|---|---|---|---|
| | | | | 1 | 2 | 3 | 4 | 5 |
| Urethane prepolymer 1 | | | | 40.0 | 40.0 | 40.0 | 40.0 | 40.0 |
| Coated amine 1 | | | | | | 5.0 | | |
| Coated amine 2 | | | | 5.0 | 5.0 | | 5.0 | 5.0 |
| Isocyanate group-containing compound | Isocyanate group/hydrolyzable silyl group-containing compound | 1 | | 2.5 | | 2.5 | 2.5 | |
| | | 2 | | | | | | 2.5 |
| | | 3 | | | | | | |
| | | 4 | | | | | | |
| | Isocyanate group/(meth)acryloyl group-containing compound | 1 | | | 2.5 | | | 2.5 |
| | | 2 | | | | 2.5 | 2.5 | |
| | | 3 | | | | | | |
| | | 4 | | | | | | |
| Tertiary amine | | | | 1.0 | 1.0 | 1.0 | 1.0 | 1.0 |
| Carbon black 1 | | | | | | | | |
| Carbon black 2 | | | | | | | | |
| Calcium carbonate | | | | 44.0 | 44.0 | 44.0 | 44.0 | 44.0 |
| Plasticizer | | | | 5.0 | 5.0 | 5.0 | 5.0 | 5.0 |
| Initial | Glass/PBT shear strength | Curing condition 1 | | Good CF50 AF (PBT side) 50 | Good CF40 AF (glass side) 60 | Good CF80 AF (glass side) 10 AF (PBT side) 10 | Good CF85 AF (glass side) 5 AF (PBT side) 10 | Good CF85 AF (glass side) 5 AF (PBT side) 10 |
| | | Curing condition 2 | | Good CF80 AF (PBT side) 20 | Good CF85 AF (glass side) 15 | Good CF90 AF (PBT side) 10 | Good CF90 AF (PBT side) 10 | Good CF95 AF (PBT side) 5 |
| | | Curing condition 3 | | Good CF80 AF (PBT side) 20 | Good CF80 AF (glass side) 20 | Good CF90 AF (PBT side) 10 | Good CF90 AF (PBT side) 10 | Good CF90 AF (PBT side) 10 |
| After storage test (stored at 40° C. for 1 W) | Ejection performance using glue gun | | | Good | Good | Marginal | Good | Good |
| | Glass/PBT shear strength | Curing condition 1 | | Good CF50 AF (PBT side) 50 | Good CF45 AF (glass side) 55 | Marginal CF50 AF (glass side) 5 AF (PBT side) 15 | Good CF80 AF (glass side) 10 AF (PBT side) 10 | Good CF80 AF (glass side) 10 AF (PBT side) 10 |
| | | Curing condition 2 | | Good CF80 AF (PBT side) 20 | Good CF85 AF (glass side) 15 | Good CF25 AF (PBT side) 25 | Good CF95 AF (PBT side) 5 | Good CF95 AF (PBT side) 5 |
| | | Curing condition 3 | | Good CF80 AF (PBT side) 20 | Good CF80 AF (glass side) 20 | Marginal CF75 AF (PBT side) 25 | Good CF90 AF (PBT side) 10 | Good CF95 AF (PBT side) 5 |

TABLE 1-2

| | | | Examples | | | | Comparative Example |
|---|---|---|---|---|---|---|---|
| | | | 6 | 7 | 8 | 9 | 1 |
| Urethane prepolymer 1 | | | 40.0 | 40.0 | 40.0 | 40.0 | 45.0 |
| Coated amine 1 | | | | | | | 5.0 |
| Coated amine 2 | | | 5.0 | 5.0 | 5.0 | 5.0 | |
| Isocyanate group-containing compound | Isocyanate group/hydrolyzable silyl group-containing compound | 1 | | | | | |
| | | 2 | | | 2.5 | 2.5 | |
| | | 3 | 2.5 | | | | |
| | | 4 | | 2.5 | | | |
| | Isocyanate group/(meth)acryloyl group-containing compound | 1 | | | 2.5 | 2.5 | |
| | | 2 | | | | | |
| | | 3 | | 2.5 | | | |
| | | 4 | 2.5 | | | | |
| Tertiary amine | | | 1.0 | 1.0 | 1.0 | 1.0 | 1.0 |
| Carbon black 1 | | | | | 5.0 | 5.0 | |
| Carbon black 2 | | | | | 25.0 | 39.0 | |
| Calcium carbonate | | | 44.0 | 44.0 | 14.0 | | 44.0 |
| Plasticizer | | | 5.0 | 5.0 | 5.0 | 5.0 | 5.0 |
| Initial | Glass/PBT shear strength | Curing condition 1 | Good CF80 AF (glass side) 5 AF (PBT side) 15 | Good CF80 AF (glass side) 5 AF (PBT side) 15 | Excellent CF85 AF (glass side) 5 AF (PBT side) 10 | Excellent CF85 AF (glass side) 5 AF (PBT side) 10 | Poor AF (glass side) 50 AF (PBT side) 50 |
| | | Curing condition 2 | Good CF80 AF (PBT side) 20 | Good CF80 AF (PBT side) 20 | Excellent CF90 AF (glass side) 5 AF (PBT side) 5 | Excellent CF100 | Poor AF (glass side) 100 |
| | | Curing condition 3 | Good CF90 AF (PBT side) 10 | Good CF80 AF (PBT side) 20 | Excellent CF90 AF (glass side) 5 AF (PBT side) 5 | Excellent CF95 AF (PBT side) 5 | Poor AF (glass side) 50 AF (PBT side) 50 |
| After storage test (stored at 40° C. for 1 W) | Ejection performance using glue gun | | Good | Good | Good | Good | Poor (thickened) |
| | Glass/PBT shear strength | Curing condition 1 | Good CF80 AF (glass side) 5 AF (PBT side) 15 | Good CF80 AF (PBT side) 20 | Excellent CF85 AF (glass side) 5 AF (PBT side) 10 | Excellent CF85 AF (glass side) 5 AF (PBT side) 10 | Poor AF (glass side) 50 AF (PBT side) 50 |
| | | Curing condition 2 | Good CF80 AF (PBT side) 20 | Good CF80 AF (PBT side) 20 | Excellent CF95 AF (PBT side) 5 | Excellent CF95 AF (PBT side) 5 | Poor AF (glass side) 100 |
| | | Curing condition 3 | Good CF80 AF (PBT side) 20 | Good CF80 AF (PBT side) 20 | Excellent CF90 AF (glass side) 5 AF (PBT side) 5 | Excellent CF95 AF (PBT side) 5 | Poor AF (glass side) 100 |

Details of the components described in Table 1 are as follows.

Urethane prepolymer 1: urethane prepolymer produced by mixing 70 parts by mass of polyoxypropylene diol (trade name: SANNIX PP2000, manufactured by Sanyo Chemical Industries, Ltd.; weight average molecular weight: 2000), polyoxypropylene triol (trade name: SANNIX GP3000, manufactured by Sanyo Chemical Industries, Ltd.; weight average molecular weight: 3000), and diphenylmethane diisocyanate (MDI; trade name: Sumidur 44S, manufactured by Sumika Bayer Urethane Co., Ltd.) in a manner that NCO/OH (molar ratio) was 2.0, and reacting the mixture in a condition at 80° C. for 5 hours Coated amine 1: coated amine in which a solid amine having a melting point of 68° C. (1,12-dodecanediamine (1,12-dodecamethylenediamine)) was coated with a filler (titanium oxide; trade name: MT-150A, manufactured by Tayca Corporation; form: cubic crystal (spherical); average particle size: 0.015 μm; major axis/particle thickness: 3.4)

The coated amine 1 was produced by the method described below.

The coated amine 1 was produced by mixing 30 parts by mass of a solid amine (1,12-dodecamethylenediamine (manufactured by Tokyo Chemical Industry Co., Ltd.; melting point: 68° C.; ground product that was crushed using a pin mill and that had been passed through a screen width of 300 μm; average particle size 10 μm)) and 30 parts by mass of the filler as a covering material using a Henschel mixer in a condition at 50° C. for 10 minutes to 30 minutes.

Coated amine 2: 30 parts by mass of 1,12-dodecamethylenediamine (manufactured by Tokyo Chemical Industry Co., Ltd.; melting point: 68° C.; ground product that was crushed using a pin mill and that had been passed through a screen width of 300 μm; average particle size 10 μm) as a solid amine, 70 parts by mass of light calcium carbonate 1 (trade name: TamaPearl TP-123, manufactured by Okutama Kogyo Co., Ltd.; form: spindle-like; particle thickness: 0.2 μm; major axis: 1.5 μm; major axis/particle thickness: 7.5) as a covering material (filler), and 1 part by mass, per 100 parts by mass total of the solid amine and the covering material (filler), of silicone oil (methylhydrogen silicone oil; trade name: KF-99; manufactured by Shin-Etsu Chemical Co., Ltd.) as a surface treating agent were used. These were mixed using a Henschel mixer in a condition at 50° C. for 10 minutes to 30 minutes to produce the coated amine 2. Note that the average particle size of the produced coated amine 2 was 11 μm.

Isocyanate Group/Hydrolyzable Silyl Group-Containing Compound 1

The isocyanate group/hydrolyzable silyl group-containing compound 1 was a compound obtained by agitating 100 parts by mass of an isocyanurate of hexamethylene diisocyanate (HDI; isocyanate group content: 22.7%; hereinafter the same) and 27.6 parts by mass of N-phenyl-3-aminopropyltrimethoxysilane in a manner that NCO/NH (molar ratio) was 5 in a condition at 60° C. for 8 hours to allow the mixture to react.

The obtained compound had an isocyanate group bonded to an aliphatic hydrocarbon group and a trimethoxysilyl group.

Isocyanate Group/Hydrolyzable Silyl Group-Containing Compound 2

Production was performed in the same manner as in the production of the isocyanate group/hydrolyzable silyl group-containing compound 1, except for replacing the isocyanurate of hexamethylene diisocyanate with 100 parts by mass of an allophanate of hexamethylene diisocyanate (isocyanate group content: 19.2%; hereinafter the same) and replacing the N-phenyl-3-aminopropyltrimethoxysilane with 17.9 parts by mass of 3-mercapto-propyltrimethoxysilane, in a manner that NCO/SH (molar ratio) was 5.

The obtained compound (isocyanate group/hydrolyzable silyl group-containing compound 2) had an isocyanate group bonded to an aliphatic hydrocarbon group and a trimethoxysilyl group.

Isocyanate Group/Hydrolyzable Silyl Group-Containing Compound 3

Production was performed in the same manner as in the production of the isocyanate group/hydrolyzable silyl group-containing compound 1, except for replacing the isocyanurate of hexamethylene diisocyanate with 58.5 parts by mass of a biuret of hexamethylene diisocyanate (isocyanate group content: 23.3%; hereinafter the same) and changing the amount of the N-phenyl-3-aminopropyltrimethoxysilane to 47.2 parts by mass, in a manner that NCO/NH (molar ratio) was 3.

The obtained compound (isocyanate group/hydrolyzable silyl group-containing compound 3) had an isocyanate group bonded to an aliphatic hydrocarbon group and a trimethoxysilyl group.

Isocyanate Group/Hydrolyzable Silyl Group-Containing Compound 4

Production was performed in the same manner as in the production of the isocyanate group/hydrolyzable silyl group-containing compound 1, except for replacing the isocyanurate of hexamethylene diisocyanate with 100 parts by mass of isophorone diisocyanate (isocyanate group content: 37.5%) and replacing the N-phenyl-3-aminopropyltrimethoxysilane with 52.5 parts by mass of N-n-butyl-3-aminopropyltrimethoxysilane, in a manner that NCO/NH (molar ratio) was 4.

The obtained compound (isocyanate group/hydrolyzable silyl group-containing compound 4) had an isocyanate group bonded to an aliphatic hydrocarbon group and a trimethoxysilyl group.

Isocyanate Group/(Meth)Acryloyl Group-Containing Compound 1

Production was performed in the same manner as in the production of the isocyanate group/hydrolyzable silyl group-containing compound 1, except for replacing the N-phenyl-3-aminopropyltrimethoxysilane with 12.4 parts by mass of N-2-hydroxyethylacrylamide, in a manner that NCO/OH (molar ratio) was 5.

The obtained compound (isocyanate group/(meth)acryloyl group-containing compound 1) had an isocyanate group bonded to an aliphatic hydrocarbon group and a (meth)acryloyl group.

Isocyanate Group/(Meth)Acryloyl Group-Containing Compound 2

The isocyanate group/(meth)acryloyl group-containing compound 2 was a compound obtained by reacting 100 parts by mass of an allophanate of hexamethylene diisocyanate (isocyanate group content: 19.2%) and 13.1 parts by mass of N-2-hydroxyethylacrylamide, in a manner that NCO/OH (molar ratio) was 4, in a condition at 60° C. for 8 hours while the mixture was agitated.

The obtained compound had an isocyanate group bonded to an aliphatic hydrocarbon group and a (meth)acryloyl group.

Isocyanate Group/(Meth)Acryloyl Group-Containing Compound 3

The isocyanate group/(meth)acryloyl group-containing compound 3 was a compound obtained by reacting 100 parts by mass of a biuret of hexamethylene diisocyanate (isocyanate group content: 23.3%) and 20 parts by mass of 4-n-hydroxybutylacrylate, in a manner that NCO/OH (molar ratio) was 4, in a condition at 60° C. for 8 hours while the mixture was agitated.

The obtained compound had an isocyanate group bonded to an aliphatic hydrocarbon group and a (meth)acryloyl group.

Isocyanate Group/(Meth)Acryloyl Group-Containing Compound 4

Production was performed in the same manner as in the production of the isocyanate group/(meth)acryloyl group-containing compound 3, except for replacing the biuret of hexamethylene diisocyanate with 121.2 parts by mass of an allophanate of hexamethylene diisocyanate and changing the amount of the 4-n-hydroxybutylacrylate to 16.5 parts by mass, in a manner that NCO/OH (molar ratio) was 4.

The obtained compound (isocyanate group/(meth)acryloyl group-containing compound 4) had an isocyanate group bonded to an aliphatic hydrocarbon group and a (meth) acryloyl group.

Tertiary amine: dimorpholinodiethylether, manufactured by San-Apro Ltd.
Carbon black 1: trade name: MA600 (manufactured by Mitsubishi Chemical Corporation)
Carbon black 2: A2899, manufactured by Asahi Carbon Co., Ltd.
Calcium carbonate: beef tallow fatty acid ester-treated calcium carbonate; trade name: SEALETS 200, manufactured by Maruo Calcium Co., Ltd.
Plasticizer: diisononyl phthalate (DINP)

As is clear from the results shown in Tables 1-1 and 1-2, Comparative Example 1, which contained no isocyanate group-containing compound, exhibited low storage stability and low shear strength after being cured (in detail, the initial and after the storage test). It is conceived that the shear strength was low because curing by moisture or low temperature heating was difficult in Comparative Example 1.

On the other hand, Examples 1 to 9 achieved excellent storage stability, ease in curing by moisture and/or low-temperature heating, and high shear strength and excellent failure state after being cured.

Furthermore, Examples 1 to 9 were capable of being cured by moisture and/or by heating.

When Example 1 and Example 4 were compared, Example 4 exhibited superior failure state after the shear test and superior adhesion than those of Example 1. When Example 2 and Example 5 were compared, Example 5 exhibited superior failure state after the shear test and superior adhesion than those of Example 2. Because of this, it was found that the case where a combination of isocyanate group/hydrolyzable silyl group-containing compound and isocyanate group/(meth)acryloyl group-containing compound was used exhibited superior adhesion than that of the case where each of the isocyanate group/hydrolyzable silyl group-containing compound or the isocyanate group/(meth) acryloyl group-containing compound was used alone.

When Examples 3 and 4 were compared, Example 4 exhibited superior ejection properties than that of Example 3. Example 4 also showed cases where the shear strength was high. Because of this, it was found that the case in which the form of the filler constituting the coated amine was spindle-like form, rather than spherical, exhibited superior storage stability and shear strength.

When Example 5 and Examples 8 and 9 were compared, Examples 8 and 9, which contained carbon black as a filler, exhibited superior shear strength than that of Example 5. Because of this, it was found that the case in which at least carbon black was used as a filler exhibited superior shear strength than that of the case using calcium carbonate.

The invention claimed is:

1. A curable resin composition comprising:
    a urethane prepolymer having an isocyanate group;
    a coated amine in which a solid amine having a melting point of 50° C. or higher is coated with a filler;
    an isocyanate group-containing compound having an isocyanate group bonded to an aliphatic hydrocarbon group and at least one type selected from the group consisting of hydrolyzable silyl groups and (meth)acryloyl groups; and
    a tertiary amine compound; wherein:
        the solid amine is reactive with the isocyanate group of the urethane prepolymer or the isocyanate group-containing compound;
        the isocyanate group-containing compound contains at least one type selected from the group consisting of isocyanate group/hydrolyzable silyl group-containing compounds and isocyanate group/(meth)acryloyl group-containing compounds;
        the isocyanate group/hydrolyzable silyl group-containing compound is a compound obtained by reacting adducts, isocyanurates, biurets, or allophanates of hexamethylene diisocyanate with at least one type selected from the group consisting of secondary aminosilanes and mercaptosilanes; and
        the isocyanate group/(meth)acryloyl group-containing compound has an isocyanate group bonded to an aliphatic hydrocarbon group and (meth)acryloyl groups; wherein:
        a ratio value of a major axis of the filler to a particle thickness of the filler (major axis/particle thickness) is from 4 to 95, and the particle thickness is from 0.01 μm to 1 μm;
        an amount of the filler is from 100 to 250 parts by mass per 100 parts by mass of the solid amine; and
        all or at least a part of the coated amine surface has been subjected to hydrophobizing surface treatment by a silicone oil.

2. The curable resin composition according to claim 1, further comprising a second filler.

3. The curable resin composition according to claim 1, wherein the isocyanate group/(meth)acryloyl group-containing compound contains a compound obtained by reacting an aliphatic polyisocyanate compound with at least one type selected from the group consisting of hydroxy group-containing (meth)acrylamides, and hydroxy group-containing (meth)acrylates.

4. The curable resin composition according to claim 3, further comprising a second filler.

5. The curable resin composition according to claim 1, wherein a major axis of the filler is from 2.5 to 15 μm.

6. The curable resin composition according to claim 1, wherein the major axis of the filler is from 0.1 to 15 μm.

7. The curable resin composition according to claim 1, wherein the ratio value of the major axis of the filler to the particle thickness of the filler (major axis/particle thickness) is from 4 to 75.

* * * * *